United States Patent [19]

Numata et al.

[11] Patent Number: 5,702,615

[45] Date of Patent: Dec. 30, 1997

[54] METHOD FOR THE TREATMENT OF WASTE WATER

[75] Inventors: Shigeaki Numata; Souichi Shibuya, both of Kawasaki, Japan

[73] Assignee: Kawasaki Kasei Chemicals Ltd., Tokyo, Japan

[21] Appl. No.: 670,786

[22] Filed: Jun. 24, 1996

[30] Foreign Application Priority Data

Jun. 27, 1995 [JP] Japan ................................. 7-161301

[51] Int. Cl.$^6$ ........................................................ C02F 1/72
[52] U.S. Cl. ........................... 210/759; 210/763; 210/916; 210/919; 210/928; 423/244.1
[58] Field of Search ................................ 210/759, 762, 210/763, 916, 928, 919; 162/189; 423/243.07, 244.01, 244.1

[56] References Cited

U.S. PATENT DOCUMENTS

| | | | |
|---|---|---|---|
| 3,226,320 | 12/1965 | Meuly et al. | 210/763 |
| 4,361,487 | 11/1982 | Hills et al. | 210/763 |
| 4,443,342 | 4/1984 | Stas et al. | 210/759 |
| 4,729,835 | 3/1988 | McNeillie et al. | 210/759 |
| 5,141,647 | 8/1992 | Bhadra | 210/763 |
| 5,207,927 | 5/1993 | Marinangeli et al. | 210/916 |
| 5,286,389 | 2/1994 | Hardison | 210/712 |

FOREIGN PATENT DOCUMENTS

| | | |
|---|---|---|
| 64-30696 | 2/1989 | Japan . |
| 2-78488 | 3/1990 | Japan . |
| 4-59039 | 9/1992 | Japan . |

OTHER PUBLICATIONS

"Hydrogen Peroxide: A Potent Force To Destroy Organics in Wastewater," Lysette Plant, et al. Chemical Engineering; Sep. 1994, pp.EE 16–20.

"Treating Industrial Wastewater With Hydrogen Peroxide," William H. Kibbel, Jr. Plant Engineering; Nov. 15, 1979, pp. 137–140.

*Primary Examiner*—Peter A. Hruskoci
*Attorney, Agent, or Firm*—Oblon, Spivak, McClelland, Maier & Neustadt, P.C.

[57] ABSTRACT

A method for the treatment of waste water, which comprises treating waste water containing at least a sulfide-type malodorous substance, in the presence of a transition metal compound and hydrogen peroxide or a hydrogen peroxide-forming compound, wherein at least an iron family element compound and a vanadium family element compound are used as the transition metal compound.

14 Claims, No Drawings

METHOD FOR THE TREATMENT OF WASTE WATER

BACKGROUND OF THE INVENTION

1. Field of the Invention

The present invention relates to a method for the treatment of waste water. More particularly, it relates to a method for treating and deodorizing waste water containing sulfide-type malodorous substances such as hydrogen sulfide, methylmercaptan, methyl sulfide and methyl disulfide, discharged from e.g. a kraft pulp production plant, a chemical production plant, a fishbone disposal plant or a refuse disposal plant.

2. Discussion of Background

Pulp as raw material for paper making is produced on large scales throughout the world, and in. Japan, the annual production of pulp is about 10,000,000 tons (in 1993), the majority of which is production of kraft pulp. In the production of kraft pulp, it is possible substantially to recover chemical reagents used for the production, the quality of the pulp thereby obtainable is excellent, and the process has many features economically excellent as compared with other production processes. However, there is a problem that sulfide-type malodorous substances are discharged.

Namely, blow gas or cooking waste liquid discharged during the production of kraft pulp, contains sulfide-type malodorous substances formed by the reaction of methoxyl groups in lignin with sodium sulfide. More specifically, such sulfide-type malodorous substances will be formed from the entire process for treatment of black liquor, such as a step for extracting black liquor upon completion of cooking, a blow tank in cooking, a step for separating and washing pulp and black liquor, an evaporator for concentrating black liquor and a recovery boiler for burning concentrated black liquor, as well as from a process for recovering and regenerating the reagents for cooking, and a process for treating waste water.

Especially, from the cooking, washing, black liquor concentration and reagent recovery steps, the malodorous substances are discharged mainly in the form of gas, and this gas is separated by a condenser into a non-condensable gas and condensed water (drain). For example, the majority of malodorous components in black liquor will transfer to condensed water during the concentration in an evaporator. Accordingly, to deodorize the condensed water, stripping treatment will further be required.

However, for such stripping treatment, a large installation cost will be required for the treating apparatus, and there will be an economical restriction in introducing such an installation anew. Even if an existing installation is employed, a large cost will be required for the energy such as steam to completely deodorize such condensed water solely by stripping treatment, such being uneconomical. Further, in view of environmental protection, it is required that malodorous substances should be as little as possible in the waste water, and a method is desired for economically treating malodorous substances from the sources for generating such malodorous substances.

Thus, it is an object of the present invention to provide a method for removing, from waste water containing sulfide-type malodorous substances, particularly hydrogen sulfide, methylmercaptan, methyl sulfide and methyl disulfide, discharged from a kraft pulp production plant, a chemical production plant, a fishbone disposal plant or a refuse disposal plant, such malodorous substances all at once.

The present inventors have prepared an aqueous mixture containing sulfide-type malodorous substances, particularly hydrogen sulfide, methylmercaptan, methyl sulfide and methyl disulfide, and treated the aqueous mixture in the presence of hydrogen peroxide and a compound of a transition metal (a transition element) such as iron, whereby it has been surprisingly found that all of such malodorous substances can simultaneously be removed. (Japanese Patent Application No. 316502/1994).

However, in the system of hydrogen peroxide and a compound of a transition metal such as iron of the above invention, a phenomenon has been observed wherein hydrogen peroxide is consumed by a relatively easily oxidizable substance such as methanol. Therefore, in a case where, as in certain actual waste water, methanol or the like is present in a large amount at a level of at least 3,000 ppm, there has been a problem that the removal rate of the intended sulfide-type malodorous substances, particularly methyl disulfide, tends to decrease.

SUMMARY OF THE INVENTION

The present inventors have now found that all malodorous substances can be treated simultaneously without receiving an influence by a relatively readily oxidizable substance such as methanol, by employing a vanadium compound together with an iron compound in the treatment, with hydrogen peroxide, of an aqueous mixture containing sulfide-type malodorous substances, particularly hydrogen sulfide, methylmercaptan, methyl sulfide and methyl disulfide. The present invention has been accomplished on the basis of this discovery.

Thus, the present invention provides a method for the treatment of waste water, which comprises treating waste water containing at least a sulfide-type malodorous substance, in the presence of a transition metal compound and hydrogen peroxide or a hydrogen peroxide-forming compound, wherein at least an iron family element compound and a vanadium family element compound are used as the transition metal compound.

DETAILED DESCRIPTION OF THE PREFERRED EMBODIMENTS

The waste water to be treated by the present invention is waste water containing sulfide-type malodorous substances, particularly hydrogen sulfide, methylmercaptan, methyl sulfide and methyl disulfide, including all types of waste water containing sulfide-type malodorous substances discharged from e.g. a kraft pulp production plant, a chemical production plant, a fishbone disposal plant or a refuse disposal plant.

Further, sewage or polluted sludge from sewer pipelines, storage tanks or sewage disposal installations, may be treated by the present invention, so long as such sewage or polluted sludge contains the above-mentioned sulfides.

It is known that hydrogen sulfide alone may be treated with oxygen and a redox catalyst. Whereas, the method of the present invention is extremely effective to treat waste water containing methyl sulfide and methyl disulfide simultaneously.

Particularly, in a kraft pulp production plant, condensed water discharged from a cooking step, a step of separating and washing pulp, a step of concentrating black liquor (evaporating and concentrating apparatus) or an odorous gas cooler, and process waste water such as water used for stripping treatment of such condensed water, may be treated by the present invention. Such process waste water usually contains sulfides such as hydrogen sulfide, methylmercaptan, methyl sulfide and methyl disulfide, although such can not generally be defined, since the production method and the method for treating black liquor differ from one plant to another.

Further, there is waste water which contains a large amount of a relatively readily oxidizable component such as methanol (hereinafter referred to as a readily oxidizable substance).

In the present invention, the above-mentioned waste water contains components which can readily be removed by stripping. Accordingly, it is economically advantageous that this waste water is subjected to conventional stripping methods such as (1) air stripping, (2) steam stripping (atmospheric pressure method) and (3) steam stripping (reduced pressure method) to remove the majority of malodorous substances, and the method of the present invention is applied to the remaining treated water containing malodorous substances, whereby reagents to be used can substantially be reduced.

However, in the present invention, there may be present, as malodorous substances, instead of methylmercaptan, other alkylmercaptans (RSH) such as ethylmercaptan and butylmercaptan; instead of methyl sulfide, other alkyl sulfides (RSR) such as ethyl sulfide and butyl sulfide; or instead of methyl disulfide, other alkyl disulfide (RSSR) such as ethyl disulfide and butyl disulfide, or other alkyl polysulfides such as methyl trisulfide.

The oxidizing agent to be used in the present invention may be hydrogen peroxide. However, a peroxide which produces hydrogen peroxide under the treating conditions, may likewise be used. For example, a peroxide such as sodium peroxide or calcium peroxide may be mentioned.

Further, as the hydrogen peroxide to be used in the present invention, waste water from waste paper bleaching or waste water from pulp bleaching, which contains hydrogen peroxide, discharged from a pulp plant, may also be used. By utilizing hydrogen peroxide in such waste water, the amount of hydrogen peroxide to be added afresh may be reduced, such being economically advantageous.

The amount of hydrogen peroxide or a hydrogen peroxide-forming peroxide in the present invention is selected within a range of from 1 to 20 mol times, preferably from 2 to 10 mol times, more preferably from 3 to 10 mol times, relative to the sulfur element in sulfides as malodorous substances.

In the present invention, at least an iron family element compound and a vanadium family element compound are used as the transition metal compound.

The iron family element compound includes compounds of iron, cobalt and nickel, and for example, sulfates, nitrates and chlorides of these metals may be employed. Among them, iron compounds are preferred, which may, for example, be ferrous sulfate, ferric sulfate, ferrous nitrate, ferric nitrate, ferrous chloride and ferric chloride. Particularly preferred are sulfates. Further, polyferric sulfate ("POLYTETSU", tradename, for an aqueous polyferric sulfate solution, manufactured by Nittetsu Kogyo K.K.) may also be used.

The vanadium family element compound includes compounds of vanadium, niobium and tantalum, and for example, sulfates, chlorides and oxides of these metals, may be employed. Among them, vanadium compounds are preferred, such as vanadyl sulfate, vanadium trichloride, vanadium oxydichloride (vanadyl (IV) chloride), ammonium methavanadate and vanadium pentoxide. From the viewpoint of handling efficiency, vanadyl sulfate is preferred.

In the present invention, the iron family element compound is used in an amount within a range of from 0.002 to 4.0 mol times, preferably from 0.02 to 2.0 mol times, more preferably from 0.1 to 2.0 mol times, relative to the sulfur element in the sulfide-type malodorous substances in waste water.

The vanadium family element compound is used usually in an amount of from 0.02 to 4.0 mol times, preferably from 0.02 to 2.0 mol times, more preferably from 0.1 to 2.0 mol times, relative to the sulfur element in the sulfide-type malodorous substances in waste water.

The ratio of the iron group element compound to the vanadium family element compound may be optionally selected within the above-mentioned ranges of the amounts. However, it is usually preferred to use the vanadium element compound in an amount within a range of from 0.05 to 10 mol times, relative to the iron group element compound, and it is particularly preferred to use it within a range of from 0.1 to 2 mol times.

Further, in the present invention, other element compounds may be present so long as they do not adversely affect the functions of the iron family element compound and the vanadium family element compound.

With respect to conditions for such treatment with hydrogen peroxide and a transition metal compound, the pH is selected usually within a range of from 2 to 13, preferably from 3 to 11, the treating temperature is selected usually within a range of from 20° to 90° C., preferably from 30° to 80° C., and the treating pressure is selected usually from atmospheric pressure to 3 kg/cm$^2$G.

The treating method in the present invention is usually carried out as follows.

For example, predetermined amounts of hydrogen peroxide, the iron family element compound and the vanadium family element compound are added to waste water containing predetermined amounts of malodorous substances, followed by oxidation treatment under predetermined treating conditions. Such treatment may be carried out in a batch system wherein a predetermined amount of the mixture is put and reacted in e.g. a reaction vessel, or in a continuous system in which reaction is carried out while introducing waste water and predetermined amounts of hydrogen peroxide and the transition metal compounds simultaneously.

The treated water thus obtained exhibits acidity, since the pH decreases as an acid component such as sulfuric acid or sulfonic acid is formed by oxidation of sulfides. Accordingly, it is neutralized, as the case requires, and as it has little malodor, it can be discharged to a river or sewage after treating it by usual waste water treatment, such as bioactive treatment, to a predetermined level.

The effects of the present invention can be confirmed by a conventional method which is a combination of a head space method and gas chromatograph (hereinafter referred to as GC), wherein a predetermined amount of waste water sample is put in a predetermined container, and predetermined amounts of hydrogen peroxide and the transition metal compounds are added to treat the sample, whereupon a head space gas (a gas phase at the top of the container) is sampled and directly injected into GC (Shigen Kankyo Taisaku, vol. 30, No. 8, p. 2–7 and 14–19 (1994)). According to the head space method, the concentrations of hydrogen sulfide, methylmercaptan, methyl sulfide and methyl disulfide in the liquid phase correspond to the concentrations of the respective components in a gas phase in accordance with a Henry's principle and can be calculated by the following formula:

CL=Kh-1 Ch

CL: concentration of sulfides in water (mg/l)
Ch: concentration of sulfides in the head space gas (ppm)
Kh-1: apparent Henry constant value in the head space method Although Kh-1 varies depending upon the waste water sample and the volume, temperature, etc. of the gas phase, it shows the following value under the conditions of the following Examples.

| Names of sulfides | Kh-1 |
| --- | --- |
| Hydrogen sulfide | 0.00539 |
| Methylmercaptan | 0.0149 |
| Methyl sulfide | 0.0301 |
| Methyl disulfide | 0.0600 |

The functional mechanism of the method of the present invention has not yet been completely ascertained. However, according to the method of the present invention, even if a readily oxidizable substance such as methanol is present in a large amount in waste water, there will be no such an influence that hydrogen peroxide is consumed by such a readily oxidizable substance, and all of sulfide-type malodorous substances will be oxidized and converted to substantially odorless substances such as sulfuric acid or sulfonic acid and will little be found in the treated waste water.

Now, the present invention will be described in further detail with reference to Examples. However, it should be understood that the present invention is by no means restricted by such specific Examples. In the present inventions, "%" means "% by weight" unless otherwise specified.

EXAMPLE 1 AND COMPARATIVE EXAMPLES 1 AND 2

Put into a container of 125 ml was 50 ml of waste water (containing about 3,300 ppm of methanol) obtained in a kraft pulp production plant, containing sulfide-type malodorous substances of a composition as shown in Table 1, and polyferric sulfate, vanadyl sulfate and hydrogen peroxide are further added to this container in the proportions as identified in Table 2. After closing the container, the mixture was reacted at 60° C. for 0.5 hour and one hour.

The amount of polyferric sulfate was calculated based on the content of iron ions in the aqueous polyferric sulfate solution, as measured by an atomic absorption method, on the assumption that its unit structure is $Fe_2(OH)(SO_4)_{2.5}$.

After completion of the reaction, in accordance with the head space method, a head space gas was sampled by a gas tight syringe and injected into GC to quantitatively analyze the respective sulfide components. From the concentrations of the respective sulfides in the gas phase, the concentrations of the respective sulfide components in a liquid phase were obtained, and the removal rates of the respective sulfides are shown in Table 2. In the following Tables, MM represents methylmercaptan, DMS methyl sulfide, and DMDS methyl disulfide.

Further, on the assumption that under the conditions of the present invention, methylmercaptan is decomposed by oxidation via methyl disulfide, the removal rate of methyl disulfide was calculated including the amount of methyl disulfide corresponding to the removed methylmercaptan.

TABLE 1

| Contents of malodorous substances (mg/l) | | | | Methanol content | pH before waste water |
| --- | --- | --- | --- | --- | --- |
| $H_2S$ | MM | DMS | DMDS | (ppm) | treatment |
| 1.2 | 11.5 | 10.3 | 3.0 | about 3,300 | 4.4 |

TABLE 2

| | Added reagents and their amounts (mol ratio to the sulfur element in sulfides) | | | Reaction time | Removal rates of sulfides in waste water (%) | | | | pH of waste water after |
| --- | --- | --- | --- | --- | --- | --- | --- | --- | --- |
| | Polyferric sulfate | $VOSO_4$ | $H_2O_2$ | (hr) | $H_2S$ | MM | DMS | DMDS | treatment |
| Example 1 | 0.5 | 0.2 | 10 | 0.5 | >99.9 | >99.9 | >99.9 | 99.8 | 3.5 |
| | | | | 1 | >99.9 | >99.9 | >99.9 | 99.7 | 3.2 |
| Comparative Example 1 | 0.5 | none | 10 | 0.5 | 99.9 | 99.8 | 99.2 | 79 | 3.4 |
| | | | | 1 | 99.9 | 99.8 | 99.2 | 77 | 3.4 |
| Comparative Example 2 | none | 0.2 | 10 | 0.5 | >99.9 | >99.9 | 87.4 | 70 | 3.8 |
| | | | | 1 | >99.9 | >99.9 | 97.3 | 70 | 3.8 |

When the vanadium compound is used together with the iron compound as in Example 1, sulfides including methyl disulfide, were substantially completely removed. Whereas, in a case where the iron compound or the vanadium compound was used alone as shown in Comparative Example 2 or 3, particularly the removal rate of methyl disulfide decreased.

This is believed attributable to the fact that a readily oxidizable substance such as methanol was coexistent in a large amount as compared with sulfides.

EXAMPLE 2 AND COMPARATIVE EXAMPLES 3 AND 4

As transition metal compounds, polyferric sulfate, vanadyl sulfate and cuprous chloride were added in the proportions as shown in Table 4 to waste water (containing about 3,300 ppm of methanol) obtained in a kraft pulp production plant, containing sulfide type malodorous substances of a composition as shown in Table 3, and the mixture was reacted in the same manner as in Example 1 at 60° C. for 0.17 hour and 1 hour.

After completion of the reaction, in accordance with the head space method in the same manner as in Example 1, the concentrations of sulfide components in the liquid phase were obtained, and the removal rates of the respective sulfides are shown in Table 4.

With respect to the removal of methyl disulfide, the combination of the iron compound and the vanadium compound in Example 2 showed a remarkable effect over the combination of the iron compound and the copper compound in Comparative Example 3 or the combination of the copper compound and the vanadium compound in Comparative Example 4.

sulfate and vanadyl sulfate, as transition metal compounds, were added in the proportions as shown in Table 6, and the mixture was reacted at 30° C. for 0.5 hour in the same manner as in Example 1.

After completion of the reaction, in accordance with the head space method in the same manner as in Example 1, the concentrations of sulfide components in the liquid phase were obtained, and the removal rates of the respective sulfides are shown in Table 6.

In each of Examples 3 to 5, sulfides were removed almost completely.

TABLE 3

| Contents of malodorous substances (mg/l) | | | | Methanol content | pH before waste water |
|---|---|---|---|---|---|
| $H_2S$ | MM | DMS | DMDS | (ppm) | treatment |
| 0.02 | 4.2 | 10.5 | 13.5 | about 3,300 | 4.9 |

TABLE 5

| Contents of malodorous substances (mg/l) | | | | Methanol content | pH before waste water |
|---|---|---|---|---|---|
| $H_2S$ | MM | DMS | DMDS | (ppm) | treatment |
| 12.9 | 16.3 | 20.7 | 13.0 | about 4,000 | 7.2 |

TABLE 4

| | Added reagents and their amounts (mol ratio to the sulfur element in sulfides) | | | | Reaction time (hr) | Removal rates of sulfides in waste water (%) | | | | pH of waste water after treatment |
|---|---|---|---|---|---|---|---|---|---|---|
| | Polyferric sulfate | $VOSO_4$ | CuCl | $H_2O_2$ | | $H_2S$ | MM | DMS | DMDS | |
| Example 2 | 0.5 | 1 | none | 10 | 0.17 | >99.9 | 99.9 | >99.9 | 99.6 | 3.1 |
| | | | | | 1 | >99.9 | 99.9 | >99.9 | 99.4 | 3.2 |
| Comparative Example 3 | 0.5 | none | 1 | 10 | 0.17 | 94.4 | 99.2 | 97.9 | 60 | 3.4 |
| | | | | | 1 | >99.9 | >99.9 | 97.9 | 66 | 3.6 |
| Comparative Example 4 | none | 1 | 1 | 10 | 0.17 | >99.9 | >99.9 | 88.6 | 30 | 3.6 |
| | | | | | 1 | >99.9 | >99.9 | 99.9 | 85 | 4.0 |

EXAMPLES 3 TO 5

Using waste water (containing about 4,000 ppm of methanol) obtained in a kraft pulp production plant, containing sulfide-type malodorous substances of a composition as shown in Table 5, hydrogen peroxide and polyferric

TABLE 6

| | Added reagents and their amounts (mol ratio to the sulfur element in sulfides) | | | Reaction time (hr) | Removal rates of sulfides in waste water (%) | | | | pH of waste water after treatment |
|---|---|---|---|---|---|---|---|---|---|
| | Polyferric sulfate | $VOSO_4$ | $H_2O_2$ | | $H_2S$ | MM | DMS | DMDS | |
| Example 3 | 0.5 | 1 | 5 | 0.5 | >99.9 | >99.9 | >99.9 | >99.9 | 2.5 |
| Example 4 | 0.5 | 0.05 | 5 | 0.5 | >99.9 | >99.9 | >99.9 | >99.9 | 2.8 |
| Example 5 | 0.1 | 1 | 5 | 0.5 | 98.2 | >99.9 | >99.9 | >99.9 | 2.6 |

COMPARATIVE EXAMPLES 5 TO 8

Using waste water containing the same sulfide-type malodorous substances as in Examples 3 to 5, manganese sulfate, copper sulfate, zinc sulfate or aluminum sulfate was added in the proportion as shown in Table 7, instead of vanadyl sulfate, and the mixture was reacted at 30° C. for 0.5 hour in the same manner as in Example 1.

After completion of the reaction, in accordance with the head space method in the same manner as in Example 1, the concentrations of sulfide components in the liquid phase were obtained, and the removal rates of the respective sulfides are shown in Table 7.

As compared with the combination of the iron compound and the vanadium compound in Example 3, with the combinations with other metal compounds as in Comparative Examples 5 to 8, the removal rate of methyl sulfide or methyl disulfide decreased substantially.

were obtained, and the removal rates of the respective sulfides are shown in Table 9.

Not only with polyferric sulfate, but also with ferric sulfate, ferrous sulfate or a mixture thereof, sulfides were removed almost completely.

TABLE 8

| Contents of malodorous substances (mg/l) | | | | Methanol content | pH before waste water |
| --- | --- | --- | --- | --- | --- |
| $H_2S$ | MM | DMS | DMDS | (ppm) | treatment |
| 22.0 | 22.0 | 18.0 | 7.5 | about 4,000 | 6.8 |

TABLE 7

| | Added reagents and their amounts (mol ratio to the sulfur element in sulfides) | | | Reaction time | Removal rates of sulfides in waste water (%) | | | | pH of waste water after |
| --- | --- | --- | --- | --- | --- | --- | --- | --- | --- |
| | Polyferric sulfate | Upper: Reagent name Lower: Amount | $H_2O_2$ | (hr) | $H_2S$ | MM | DMS | DMDS | treatment |
| Comparative Example 5 | 0.5 | $MnSO_4$ 1 | 5 | 0.5 | >99.9 | 92.9 | 74 | 60 | 2.8 |
| Comparative Example 6 | 0.5 | $CuSO_4$ 1 | 5 | 0.5 | >99.9 | 99.6 | 68 | 66 | 2.8 |
| Comparative Example 7 | 0.5 | $ZnSO_4$ 1 | 5 | 0.5 | >99.9 | 99.3 | 52 | 49 | 2.8 |
| Comparative Example 8 | 0.5 | $Al_2(SO_4)_3$ 0.5 | 5 | 0.5 | >99.9 | 99.3 | 64 | 56 | 2.8 |

EXAMPLES 6 TO 9

Using waste water (containing about 4,000 ppm of methanol) obtained in a kraft pulp production plant, containing sulfide-type malodorous substances of a composition as shown in Table 8, ferric sulfate and ferrous sulfate were added other than polyferric sulfate, as an iron compound, and the mixture was reacted at 30° C. for 1.5 hours in the same as in Example 1.

After completion of the reaction, in accordance with the head space method in the same manner as in Example 1, the concentrations of sulfide components in the liquid phase

TABLE 9

| | Added reagents and their amounts (mol ratio to the sulfur element in sulfides) | | | Reaction time | Removal rates of sulfides in waste water (%) | | | | pH of waste water after |
| --- | --- | --- | --- | --- | --- | --- | --- | --- | --- |
| | Upper: Iron compound name Lower: Amount | $VOSO_4$ | $H_2O_2$ | (hr) | $H_2S$ | MM | DMS | DMDS | treatment |
| Example 6 | Polyferric sulfate 0.5 | 0.2 | 5 | 0.5 | >99.9 | >99.9 | >99.9 | >99.9 | 2.7 |
| Example 7 | $Fe_2(SO_4)_3$ 0.5 | 0.2 | 5 | 0.5 | >99.9 | >99.9 | >99.9 | >99.9 | 2.6 |
| Example 8 | $FeSO_4$ 1 | 0.2 | 5 | 0.5 | 99.6 | >99.9 | >99.9 | >99.9 | 2.3 |
| Example 9 | $FeSO_4 + Fe_2(SO_4)_3$ 0.5     0.25 | 0.2 | 5 | 0.5 | 99.7 | >99.9 | >99.9 | >99.9 | 2.4 |

EXAMPLES 10 AND COMPARATIVE EXAMPLES 9 TO 11

Finally, in order to see the influence of a readily oxidizable substance such as methanol, a vanadium compound was added together with an iron compound as a transition metal compound to a model waste water containing sulfide-type malodorous substances of a composition as shown in Table 10, and the mixture was reacted at 30° C. for 0.5 hour in the same manner as in Example 1.

After completion of the reaction, in accordance with the head space method in the same manner as in Example 1, the concentrations of sulfide components in the liquid phase were obtained, and the removal rates of the respective sulfides are shown in Table 11.

In a case where no methanol is present in Comparative Examples 10 and 11, methyl disulfide can be removed even with the metal compound and hydrogen peroxide only. However, in a case where methanol is present as in Example 10 and Comparative Example 9, the removal rate of methyl disulfide decreases substantially, if a vanadium compound is not added together with an iron compound.

TABLE 10

| | Contents of malodorous substances (mg/l) | | | | Methanol content (ppm) | pH before waste water treatment |
| --- | --- | --- | --- | --- | --- | --- |
| | $H_2S$ | MM | DMS | DMDS | | |
| Example 10 · Comparative Example 9 | 15.0 | 14. | 9.2 | 2.6 | about 3,900 | 9.4 |
| Comparative Example 10, 11 | 15.0 | 14.0 | 9.2 | 2.6 | none | 9.2 |

TABLE 11

| | Added reagents and their amounts (mol ratio to the sulfur element in sulfides) | | | Reaction time (hr) | Removal rates of sulfides in waste water (%) | | | | pH of waste water after treatment | Methanol |
| --- | --- | --- | --- | --- | --- | --- | --- | --- | --- | --- |
| | Polyferric sulfate | $VOSO_4$ | $H_2O_2$ | | $H_2S$ | MM | DMS | DMDS | | |
| Example 10 | 0.5 | 0.2 | 5 | 0.5 | 99.8 | >99.9 | >99.9 | >99.9 | 2.9 | Present |
| Comparative Example 9 | 0.5 | none | 5 | 0.5 | >99.9 | 43 | 59 | 69 | 3.1 | Present |
| Comparative Example 10 | 0.5 | 0.2 | 5 | 0.5 | >99.9 | >99.9 | >99.9 | >99.9 | 2.9 | Absent |
| Comparative Example 11 | 0.5 | none | 5 | 0.5 | >99.9 | 99.9 | >99.9 | 99.6 | 3.0 | Absent |

According to the method of the present invention, sulfide type malodorous substances such as hydrogen sulfide, methylmercaptan, methyl sulfide and methyl disulfide contained in waste water, can simultaneously be removed from the waste water. Even when a readily oxidizable substance such as methanol is present, the malodorous substances in the waste water can be removed without receiving any influence of such a readily oxidizable substance. The obtained treated water may be discharged after a usual waste water treatment method such as bioactive treatment.

What is claimed is:

1. A method for the treatment of waste water, which comprises treating waste water containing at least a sulfide-type malodorous substance with an amount effective to remove the sulfide-type malodorous substance of a transition metal compound and hydrogen peroxide or a hydrogen peroxide-forming peroxide, wherein at least a compound of an iron family element which is iron, cobalt or nickel and a compound of a vanadium family element which is vanadium, niobium or tantalum are used as the transition metal compounds, the ratio of vanadium family element compound to the iron family element compound being 0.05 to 10 mol times.

2. The method according to claim 1, wherein the waste water contains at least one of an alkyl sulfide and an alkyl polysulfide, as the sulfide-type malodorous substance.

3. The method according to claim 2, wherein the alkyl sulfide is methylmercaptan or methyl sulfide, and the alkyl polysulfide is methyl disulfide.

4. The method according to claim 1, wherein the sulfide-type malodorous substance is hydrogen sulfide, methylmercaptan, methyl sulfide and methyl disulfide.

5. The method according to claim 1, wherein the iron family element compound is an iron compound, and the vanadium family element compound is a vanadium compound.

6. The method according to claim 1, wherein the iron family element compound is used within a range of from 0.002 to 4.0 mol times and the vanadium family element compound is used within a range of from 0.002 to 4.0 mol times, relative to the sulfur element in the sulfide-type malodorous substance in the waste water.

7. The method according to claim 1, wherein as treating conditions, the temperature is from 20° to 90° C. and the pH is from 2 to 13.

8. The method according to claim 1, wherein the hydrogen peroxide to be used, is hydrogen peroxide contained in waste water from waste paper bleaching or in waste water from pulp bleaching.

9. The method according to claim 1, wherein the waste water is a process waste water containing a malodorous substance, discharged from a kraft pulp production plant.

10. A method for the treatment of waste water containing at least a sulfide-type malodorous substance and a more readily oxidizable substance, which comprises treating the waste water with an mount effective to remove the sulfide-type malodorous substance of a transition metal compound and hydrogen peroxide or a hydrogen peroxide-forming peroxide, wherein at least a compound of an iron family element which is iron, cobalt or nickel and a compound of a vanadium family element which is vanadium niobium or tantatium are used as the transition metal compounds, wherein the effectiveness of the iron family element compound and hydrogen peroxide or hydrogen peroxide-forming compound to remove the sulfide-type malodorous substance is decreased by the presence of the more readily oxidizable substance and the amount of vanadium family element compound being sufficient to improve the removal rate over that occurring when the iron family element compound and the hydrogen peroxide or hydrogen peroxide-forming compound are used in the absence of the vanadium family element compound.

11. The method according to claim 10, wherein the iron family element compound is used within a range of from 0.002 to 4.0 mol times and the vanadium family element compound is used within a range of from 0.002 to 4.0 mol times, relative to the sulfur element in the sulfide-type malodorous substance in the waste water.

12. The method according to claim 11 wherein the ratio of the vanadium element compound to the iron family element compound is 0.05 to 10 mol times.

13. The method according to claim 12, wherein as treating conditions, the temperature is from 20° to 90° C. and the pH is from 2 to 13.

14. The method according to claim 13, wherein the iron family element compound is an iron compound, and the vanadium family element compound is a vanadium compound.

* * * * *